July 25, 1950     A. J. KREINER     2,516,578
BACKFLOW PREVENTER VALVE

Filed Sept. 21, 1946     2 Sheets-Sheet 1

INVENTOR.
ANTHONY J. KREINER
BY
Kwis, Hudson, Boughton & Williams
ATTORNEYS

July 25, 1950 A. J. KREINER 2,516,578
BACKFLOW PREVENTER VALVE

Filed Sept. 21, 1946 2 Sheets-Sheet 2

INVENTOR.
ANTHONY J. KREINER
BY
Kwis, Hudson, Boughton & Williams
ATTORNEYS

Patented July 25, 1950

2,516,578

UNITED STATES PATENT OFFICE 2,516,578

BACKFLOW PREVENTER VALVE

Anthony J. Kreiner, Wickliffe, Ohio

Application September 21, 1946, Serial No. 698,527

7 Claims. (Cl. 251—119)

This invention relates to valves of the type known as backflow preventing and vacuum relief valves, and as one of its objects aims to provide an improved and simplified construction for a valve device of this kind.

Another object of the present invention is to provide an improved construction for a valve device of this character, in which a valve member is flexibly supported and is shiftable to a passage-connecting position by the pressure of the fluid being supplied and is also shiftable by a sub-normal pressure condition to a position establishing a baffled vacuum relief passage.

A further object of this invention is to provide an improved construction for a valve device of the character mentioned, in which the shiftable valve member is formed as a part of a flexible diaphragm and has a baffled passage extending therethrough.

Still another object is to provide an improved construction for a valve device of the character referred to above, in which means is employed for positively preventing the valve member from closing the inlet passage so that a baffled relief passage will be maintained during the existence of the sub-normal pressure condition.

The present invention also provides an improved valve device of this character, embodying a check valve for minimizing the volume of the backwardly flowing material whenever a reverse flow occurs and in which the housing of the valve device is of a novel sectional construction and includes an overflow chamber.

The invention can be further briefly summarized as consisting in certain novel combinations and arrangements of parts hereinafter described and particularly set out in the appended claims.

In the accompanying sheets of drawings

Figure 1:
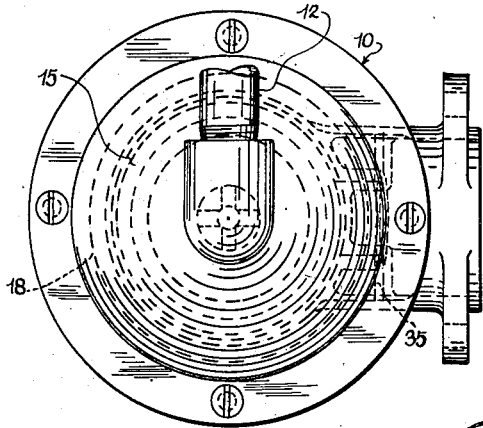
Fig. 1 is a plan view of a backflow preventer valve device embodying the present invention.
Figure 2:
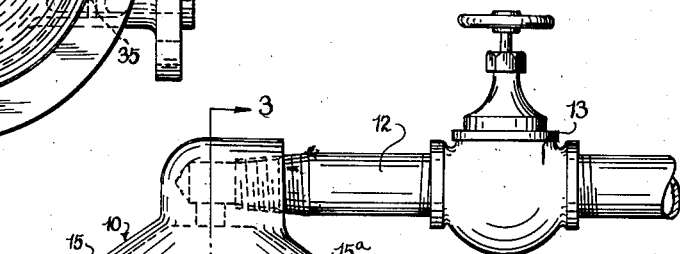
Fig. 2 is a side elevation of the valve device and showing the same with the fluid supply pipe connected thereto.

The backflow preventing valve device 10, which is illustrated in the drawings as representing one embodiment of the invention, can be used in various plumbing installations such as where it is desirable to prevent the occurrence of a return flow of fluid which might otherwise cause contamination of a supply of potable water with which such plumbing installation is connected. The improved valve device is especially suitable for this kind of service in conjunction with plumbing fixtures and the like or with utility devices such as garbage grinders, laundry machines and the like.

The drawings show the improved backflow preventing valve device 10 being used in conjunction with such a plumbing fixture or utility device 11 and connected with a water supply pipe 12 in which a control valve 13 is located. The pipe 12 represents a supply of potable water under pressure such as a domestic water supply line. When thus installed between the water supply pipe 12 and the plumbing fixture or the utility device 11 to which the water is to be supplied, this valve device serves to prevent a flow of water backwardly into the supply pipe 12 in the event that conditions exist which would otherwise permit this to occur. The valve device 10 also serves to relieve a negative pressure or vacuum condition which may at times exist in the water supply line 12.

The valve device 10 is provided with a housing 15 which contains a diaphragm chamber 16 and an outlet chamber 17. The housing 15 is of a sectional construction comprising upper, intermediate and lower housing sections 15a, 15b and 15c. The valve device 10 also includes a flexible corrugated diaphragm 18 made of soft rubber or other suitable flexible or resilient material and which extends across the diaphragm chamber 16 so as to divide the same into upper and lower pressure and relief compartments 16a and 16b. The diaphragm 18 is mounted in the housing 15 by having its outer edge clamped between the rim portions of the housing sections 15a and 15b and carries a valve member 19 which is located substantially centrally thereof, that is, on the central vertical axis of the housing. Additionally, the valve device 10 includes a check valve 20 for minimizing the volume of the return flow whenever a return flow condition occurs.

The upper housing section 15a is provided with an inlet passage 21 which communicates with the pressure compartment 16a and with which the pressure supply pipe 12 is connected. The inlet passage 21 is located substantially on the central vertical axis of the housing 15 and is surrounded by an annular group of circumferentially spaced integral projections 22 formed on the housing section 15a and which provide a stop adapted to be engaged by the valve member 19 of the diaphragm 18, as will be explained more fully hereinafter.

The intermediate housing section 15b is provided around the side wall thereof with a plurality of openings or slots 23 which connect the relief compartment 16b directly with the atmosphere. The lower end of the housing section 15b is provided with a flange 24 by which this housing section is adapted to be connected with the lower housing section 15c with a sealing gasket 25 therebetween. The bottom wall of the housing section 15b is provided with an outlet passage 26 which is also located substantially on the central vertical axis and is defined by a sleeve or nozzle 27 which extends downwardly from said bottom wall into the outlet chamber 17. The bottom wall of the housing section 15b is also provided on its inner or upper surface with a valve seat 28 which surrounds the outlet passage 26 and with the valve member 19 of the diaphragm cooperates as further explained hereinafter.

The lower housing section 15c contains a cup-shaped recess which forms the above mentioned outlet chamber 17 and also contains a discharge chamber 29 which houses the check valve 20 and is connected with the outlet chamber by the delivery passage 30. The upper end of the housing section 15c is provided with an up-turned annular flange or rim 31 which defines an overflow chamber 32 extending around the housing adjacent the atmosphere openings 23.

Figure 6:
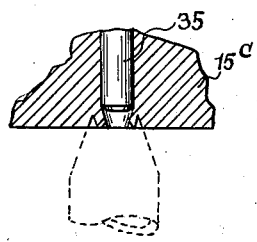
Fig. 6 is a sectional detail view showing the pivot for the swinging check valve and illustrating the staking operation performed thereon.

The check valve 20 is here shown as comprising a sloping annular seat 33 formed on the housing section 15c and surrounding the delivery passage 30 and a plate-like check valve member 34 which is supported for swinging movement by means of a pivot shaft 35 extending transversely of the discharge chamber 29 at a point adjacent to but above the valve seat 33. The valve member 34 is preferably provided with a sealing means or gasket 36 in the form of a layer or coating of rubber or other suitable material and which is engageable with the valve seat 33. The pivot shaft 35 can be suitably mounted in the housing section 15c as by means of the staking operation applied to the ends of this shaft as illustrated in Fig. 6.

The diaphragm 18 carries the valve member 19 as mentioned above and for different positions of the diaphragm this valve member is engageable either with the seat 28 of the intermediate housing section 15b or the stop formed by the projections 22 of the upper housing section 15a. The valve member 19 is, in this instance, constructed integrally with the diaphragm and is formed by the thickened central portion thereof and includes the central axial stem 37 which extends above the general plane of the diaphragm. The lower face 19a of the valve member is shaped for sealing cooperation with the valve seat 28 when pressed thereagainst by pressure in the compartment 16b.

The valve member 19 is provided with an opening 38 which extends through the diaphragm and forms a connecting passage for the pressure and relief compartments 16a and 16b. The lower end of the passage 38 communicates with the relief compartment 16b through an opening or port 38a formed in the lower surface 19a of the valve member. The upper end of the passage 38 communicates with the pressure compartment 16a through radial ports 38b formed in the side wall of the stem portion 37 of the valve member. The connecting passage 38 thus constitutes a baffled or circuitous passage which the fluid is required to follow in passing from one side of the diaphragm to the other.

Figure 3:
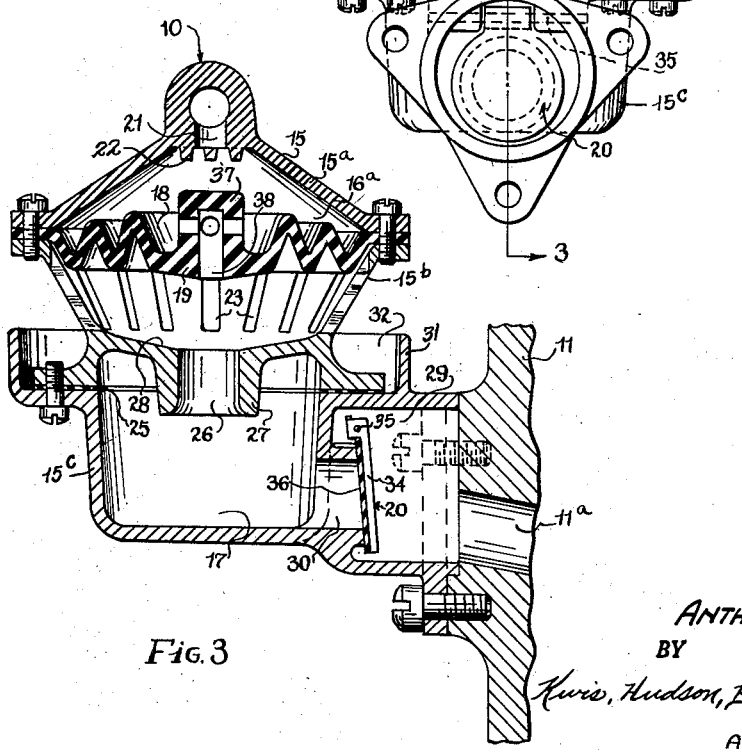
Fig. 3 is a sectional elevation taken through the valve device on line 3—3 of Fig. 2, the valve member being shown in this view in its neutral or intermediate position.
Figure 4:
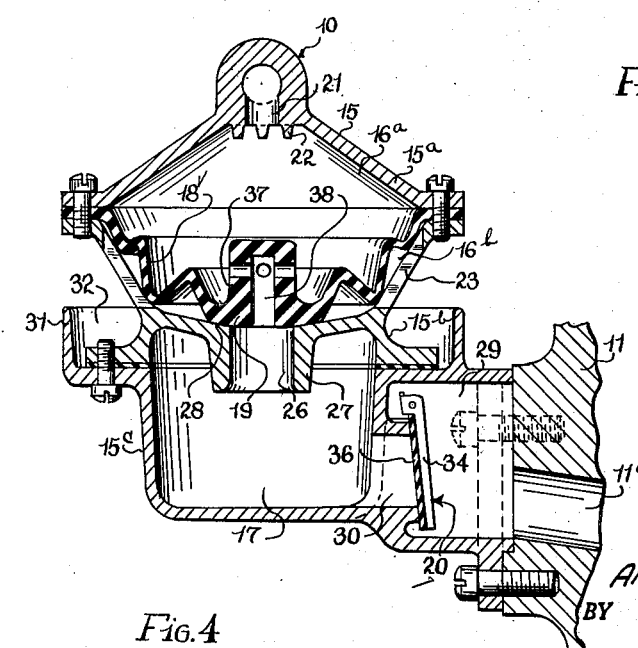
Fig. 4 is a similar sectional elevation but showing the valve member in its passage-connecting position.

When the valve 13 is opened, water from the pipe 12 enters the pressure compartment 16a through the inlet passage 21 and distends the diaphragm 18 downwardly to the flexed condition shown in Fig. 4 in which the lower surface 19a of the valve member 19 is in sealing engagement with the valve seat 28. When the diaphragm is in this position the water entering the compartment 16b through the inlet passage 21 flows downwardly through the connecting passage 38 of the valve member 19 which is then in register with the outlet passage 26. The water being delivered then flows through the outlet chamber 17 and past the check valve 20 into the discharge chamber 29 and then into the fixture or device 11 through the passage 11a thereof. As long as water under pressure is being supplied to the fixture or device 11 the diaphragm 18 remains in this downwardly flexed condition and the sealing engagement between the valve member 19 and the valve seat 28 prevents any of the water from escaping through the atmosphere openings 23. When the valve 13 is closed the pressure on the upper side of the diaphragm 18 is relieved and the diaphragm returns to its initial or intermediate position shown in Fig. 3.

The check valve member 34 normally tends to swing by gravity to a closed position against the seat 36. The characteristics of this check valve are such that the valve member 34 will be opened by a very small head of water in the outlet chamber 17 so that a complete or nearly complete drainage of this chamber will take place whenever the control valve 13 is closed. This is an important advantage in the improved backflow preventer 10 because if a substantial volume of water were to remain in the outlet chamber 17 after the control valve 13 is closed, a backflow of only a small amount of water past the check valve 20 such as might result from a flooded condition of the plumbing fixture or device 11, would be sufficient to cause the water in the chamber 17 to rise through the outlet passage 26 and overflow through the atmosphere openings 23. When the diaphragm returns to its intermediate position upon the closing of the valve 13, as mentioned above, the major portion of the water trapped above the diaphragm will be displaced by the latter from the chamber 16a and will flow downwardly through the passages 38 and 26 into the outlet chamber 17 from which it will drain past the check valve 20.

Whenever such a flooded condition occurs in the plumbing fixture or device 11 and causes a reverse flow or backward surge of water in the passage 11a, it will enter the discharge chamber 29 but since the check valve member 34 is normally in a closed position it will usually prevent the water from entering the outlet chamber 17. If, however, the check valve is prevented from seating properly or if the flooded condition exists for a prolonged period of time leakage may take place past this check valve and the water will then back up into the outlet chamber 17. Since the outlet chamber 17 is of substantial capacity and is usually in a drained or empty condition as explained above, a considerable volume of water would need to flow backwardly past the check valve 20 before any of such water would travel upwardly through the outlet passage 26 into the relief compartment 16b.

If any water does enter the relief compartment 16b it will immediately flow outwardly through the atmosphere openings 23 and will collect in the overflow chamber 32. Since the atmosphere openings 23 permit the free escape of any water which flows upwardly through the outlet passage 26, none of such water will travel through the connecting passage 38 of the diaphragm 18. This is especially true since the check valve member 34 will definitely prevent any sudden or surging flow of the water in a backward direction which might otherwise cause a portion of such water to be projected upwardly through the outlet passage 26. Such quantities of water as may from time to time escape through the atmosphere openings 23 and collect in the overflow chamber 32 need not be removed therefrom because it will be automatically disposed of by evaporation into the atmosphere. If the quantity of water which backs up into the valve device 10 is sufficient to overflow the rim 31, this will usually indicate a defective operating condition for the fixture or device 11 and the overflow water will drip onto the floor of the room and will call attention to this condition.

Figure 5:
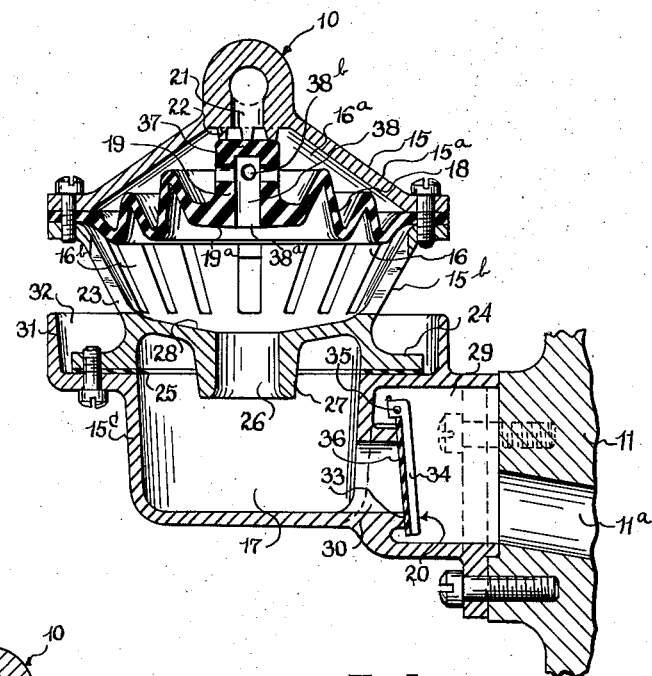
Fig. 5 is another such sectional elevation in which the valve member is in an inlet-baffling position to which it has been shifted by the existence of a sub-normal pressure condition.

If a condition should occur in which a vacuum exists in the supply line 12, it will be communicated to the compartment 16a through the inlet passage 21 and will result in the diaphragm 18 being shifted upwardly to the position shown in Fig. 5 in which the upper end of the valve member 19 stops against or engages the projections 22. These projections form a non-sealing stop which prevents the valve member from closing the inlet passage 21. Additionally these projections cooperate with the valve member in forming a baffled or circuitous passage connecting the relief compartment 16b with the inlet passage 21. With the diaphragm 18 in this position the sub-normal pressure condition or vacuum in the pipe 12 will be relieved by a flow of air inwardly through the atmosphere openings 23 and into the inlet passage 21 through the connecting passage 38. When the sub-normal pressure condition has been eliminated the diaphragm 18 will again return to its initial or intermediate position as shown in Fig. 3.

If the above described vacuum condition should occur in the supply pipe 12 at the same time that water is backing up into the valve device 10 past the check valve 20 thereof, water would still not enter the inlet passage 21 because of the baffled character of the passage then connecting the inlet passage with the relief compartment 16b and also because the atmosphere openings 23 are sufficiently large and numerous to permit any overflow water to escape freely from the relief compartment at the same time that air is entering this compartment to relieve the vacuum. Because of the number and size of the atmosphere openings in relation to other factors none of the overflow water will be picked up by the inflowing air.

From the foregoing description and the accompanying drawings it will now be readily understood that this invention provides an improved backflow preventing and vacuum relief valve device which is of a very simple construction but which will effectively prevent a return flow of fluid into a supply line and will also relieve any vacuum condition occurring in such supply line. It will also be seen that since the improved valve device functions in an automatic manner for preventing a backflow and for relieving a vacuum condition it can be used to advantage in conjunction with plumbing fixtures and utility devices and will prevent contamination of potable water contained in the supply line.

Although the improved backflow preventing and vacuum relief valve of this invention has been illustrated and described herein in considerable detail, it will be understood of course that the invention is not to be regarded as being correspondingly limited but includes all changes and modifications coming within the scope of the appended claims.

Having thus described my invention, I claim:

1. A backflow preventer and vacuum relief valve comprising a housing having a chamber therein and a flexible diaphragm extending across said chamber, said housing also having inlet and outlet passages on opposite sides of said diaphragm and openings to atmosphere on the outlet side of the diaphragm, said diaphragm having a permanently open passage extending therethrough and said inlet passage serving to normally supply pressure fluid to said chamber for delivery through said permanently open passage of the diaphragm to said outlet passage, said diaphragm being shiftable by the pressure fluid from said inlet passage acting on one side thereof to engage a portion of the diaphragm with said housing for establishing a fluid-tight connection between said diaphragm passage and said outlet passage and upon the occurrence of a vacuum in said inlet passage said diaphragm being shiftable by atmospheric pressure acting on the other side thereof to another position in which said permanently open passage is remotely spaced from said outlet passage and permits a flow of air therethrough from said openings to said inlet passage.

2. A backflow preventer and vacuum relief valve comprising a housing having a chamber therein and a flexible diaphragm extending across said chamber, said housing also having inlet and outlet passages on opposite sides of said diaphragm and openings to atmosphere on the outlet side of the diaphragm, said diaphragm having a permanently open passage extending therethrough and said inlet passage serving to normally supply pressure fluid to said chamber for delivery through said permanently open passage of the diaphragm to said outlet passage, said diaphragm being shiftable by the pressure fluid from said inlet passage acting on one side thereof to engage a portion of the diaphragm with said housing for establishing a fluid-tight connection between said diaphragm passage and said outlet passage and upon the occurrence of a vacuum in said inlet passage said diaphragm being shiftable by atmospheric pressure acting on the other side thereof to a second position in which said permanently open passage is remotely spaced from said outlet passage and permits a flow of air therethrough from said openings to said inlet passage, and means for preventing sealing engagement between said diaphragm and the portion of the housing containing said inlet passage while said diaphragm is in said second position.

3. A backflow preventer and vacuum relief valve comprising a housing containing a diaphragm chamber and substantially opposed inlet and outlet passages, stop and valve-seat elements on said housing and located respectively at said inlet and outlet passages, a diaphragm dividing said chamber into pressure and relief compartments and adapted to be flexed to extreme positions in response to pressure values in said compartments, said housing also having openings connecting said relief compartment with atmosphere, a thickened integral central portion on said diaphragm engageable with said elements upon flexing of said diaphragm to said extreme positions, said thickened portion having a permanently open passage therein which extends through the diaphragm and said thickened portion being adapted to form a fluid-tight seal with the valve seat element adjacent said outlet passage when said diaphragm is flexed to one extreme position, and means by which said thickened portion and the stop element adjacent said inlet passage are prevented from forming a fluid-tight seal when said diaphragm is flexed to the other extreme position.

4. A backflow preventer and vacuum relief valve comprising a pair of connected housing sections defining a diaphragm chamber, one of said sections having an inlet passage therein for supplying fluid to said chamber and the other section having an outlet passage leading from said chamber and a valve seat thereon surrounding said outlet passage, stop means on said one section adjacent said inlet passage, said other section also having openings therein surrounding said valve seat and connecting said chamber with atmosphere, and a flexible diaphragm extending across said chamber between said inlet and outlet passages and having a central portion containing a permanently open connecting passage which extends through the diaphragm, said central portion being adapted for sealing engagement with said valve seat in one position of the diaphragm for establishing a path of flow for the supplied fluid from said inlet passage to said outlet passage through said connecting passage and being adapted to non-sealingly engage said stop means in another position of the diaphragm for establish a path of flow for vacuum-relieving air from said openings to said inlet passage through said connecting passage.

5. In a valve device of the character described a housing containing a chamber and flexible diaphragm extending across the chamber so as to divide the same into an upper pressure compartment and a lower relief compartment, said housing having inlet and outlet passages at its upper and lower ends communicating with said pressure and relief compartments and also having openings connecting said relief compartment with atmosphere, said diaphragm being adapted to be deflected downwardly by pressure in said pressure compartment so as to be sealingly pressed against the portion of the housing surrounding said outlet passage and said diaphragm also having a stem thereon disposed substantially in axial alignment with said inlet and outlet passages, said stem having a permanently open passage therein which extends from one side of the diaphragm to the other with one end of such passage opening through the side of the stem so as to leave the upper end of said stem imperforate and the other end of said permanently open passage opening through the lower face of the diaphragm for register with said outlet passage, and means on said housing adjacent said inlet passage adapted to be engaged by said imperforate upper end of said stem and prevent the formation of a seal between said inlet passage and diaphragm when the latter is deflected upwardly.

6. A backflow preventer and vacuum relief valve comprising a housing having a chamber therein and a flexible diaprhgm extending across said chamber, said housing also having inlet and outlet passages on opposite sides of said diaphragm and openings to atmosphere on the outlet side of the diaphragm, said diaphragm having a permanently open passage extending therethrough and said inlet passage serving to normally supply pressure fluid to said chamber for delivery through said permanently open passage of the diaphragm to said outlet passage, said diaphragm being shiftable by the pressure fluid from said inlet passage acting on one side thereof to engage a portion of the diaphragm with said housing for establishing a fluid-tight connection between said diaphragm passage and said outlet passage and upon the occurrence of a vacuum in said inlet passage said diaphragm being shiftable by atmospheric pressure acting on the other side thereof to another position in which said permanently open passage is remotely spaced from said outlet passage and permits a flow of air therethrough from said openings to said inlet passage, and means defining an overflow collecting chamber extending around the housing exteriorly thereof adjacent said openings to atmosphere.

7. A backflow preventer and vacuum relief valve comprising an upright housing having a chamber therein and also having inlet and outlet passages at its upper and lower ends of which the inlet passage is a water pressure supply passage, a valve seat at the lower end of the housing and surrounding the outlet passage, a diaphragm extending laterally across said chamber between said inlet and outlet passages and having a permanently open passage extending therethrough, said housing also having an opening to atmospere on the outlet side of the diaphragm, said diaphragm being corrugated and having a range of deflection sufficient to permit the lower side of the diaphragm to be sealingly engaged with said valve seat in response to water pressure from said inlet passage acting on the upper side of the diaphragm to thereby connect said permanently open passage with said outlet passage and to also permit the upper side of the diaphragm to engage the upper end of said housing in response to atmospheric pressure acting on the lower side of the diaphragm when a vacuum occurs in said inlet passage, and means for preventing the forming of a seal between said diaphragm and said upper end of the housing.

ANTHONY J. KREINER.

REFERENCES CITED

The following references are of record in the file of this patent:

UNITED STATES PATENTS

| Number | Name | Date |
| --- | --- | --- |
| 155,041 | Pietsch | Sept. 15, 1874 |
| 1,035,366 | Leonard | Aug. 13, 1912 |
| 1,038,527 | Coleman | Sept. 17, 1912 |
| 1,099,855 | Mallory | June 9, 1914 |
| 1,150,743 | Butts | Aug. 17, 1915 |
| 1,244,382 | Slinack | Oct. 23, 1917 |
| 1,563,916 | Nieberding | Dec. 1, 1925 |
| 1,885,851 | McKee | Nov. 1, 1932 |
| 2,060,567 | Glenk | Nov. 10, 1936 |
| 2,117,389 | Yoder | May 17, 1938 |
| 2,310,516 | Clark | Feb. 9, 1943 |
| 2,322,631 | Groeniger | June 22, 1943 |